US012199366B2

(12) United States Patent
Farzaneh et al.

(10) Patent No.: US 12,199,366 B2
(45) Date of Patent: Jan. 14, 2025

(54) ANTENNA ARRAY WITH COUPLED ANTENNA ELEMENTS

(71) Applicant: GALTRONICS USA, INC., Tempe, AZ (US)

(72) Inventors: Sadegh Farzaneh, Kanata (CA); Farid Jolani, Kanata (CA); Minya Gavrilovic, Kanata (CA); Jacco Van Beek, Kanata (CA); Michael Moy, Carleton Place (CA)

(73) Assignee: GALTRONICS USA, INC., Tempe, AZ (US)

( * ) Notice: Subject to any disclaimer, the term of this patent is extended or adjusted under 35 U.S.C. 154(b) by 548 days.

(21) Appl. No.: 17/219,373

(22) Filed: Mar. 31, 2021

(65) Prior Publication Data

US 2021/0218144 A1 Jul. 15, 2021

Related U.S. Application Data

(63) Continuation of application No. PCT/US2019/066016, filed on Dec. 12, 2019.

(60) Provisional application No. 62/778,393, filed on Dec. 12, 2018.

(51) Int. Cl.
*H01Q 9/04* (2006.01)
*H01Q 19/10* (2006.01)

(52) U.S. Cl.
CPC ......... *H01Q 9/0457* (2013.01); *H01Q 19/108* (2013.01)

(58) Field of Classification Search
CPC ...... H01Q 9/04; H01Q 9/0457; H01Q 19/108; H01Q 21/06; H01Q 21/24; H01Q 21/26; H01Q 21/28; H01Q 21/062; H01Q 1/246; H01Q 1/38; H01Q 1/523
See application file for complete search history.

(56) References Cited

U.S. PATENT DOCUMENTS 5,293,176 A 3/1994 Elliot
6,597,318 B1 7/2003 Parsche
7,136,023 B2 11/2006 Reykowski
7,538,735 B2 5/2009 Crouch
9,214,739 B2 12/2015 Sover
2002/0080086 A1* 6/2002 Webb .................. H01Q 21/062 343/850
2005/0179608 A1 8/2005 Durham
2006/0220976 A1* 10/2006 Schadler ................ H01Q 1/246 343/810
2007/0139274 A1 6/2007 Durham
2007/0241984 A1* 10/2007 Schadler ................ H01Q 1/246 343/810
2009/0096702 A1* 4/2009 Vassilakis ............. H01Q 25/00 343/836

(Continued)

*Primary Examiner* — Henry Luong
(74) *Attorney, Agent, or Firm* — Bradley Arant Boult Cummings LLP; Henry B. Ward, III

(57) ABSTRACT

Systems relating to antennas. Antenna elements are coupled to adjacent other antenna elements by way of a coupler. The coupled antenna elements may be part of the same antenna array. The coupler may take the form of a substrate with conductive traces and the antenna elements may be dipoles or crossed dipole antennas. The coupled antenna elements may have similar polarizations. The capacitive coupling allows for physically smaller reflectors for antenna arrays.

18 Claims, 12 Drawing Sheets

(56) References Cited

U.S. PATENT DOCUMENTS

| | | | | |
|---|---|---|---|---|
| 2013/0069840 | A1 | 3/2013 | Lewis | |
| 2015/0295313 | A1* | 10/2015 | Zimmerman | H01Q 5/50 343/810 |

* cited by examiner

ANTENNA ARRAY WITH COUPLED ANTENNA ELEMENTS

RELATED APPLICATIONS

This application is a Continuation of PCT International Patent Application No. PCT/US2019/066016 filed on Dec. 12, 2019, which claims the benefit of U.S. Patent Application No. 62/778,393 filed on Dec. 12, 2018.

TECHNICAL FIELD

The present invention generally relates to antennas. More specifically, the present invention relates to coupled antennas or antenna arrays.

BACKGROUND

Antenna arrays are often used in cellular base stations and other applications. There is often pressure to reduce the size of the antenna arrays due to, for example, wind load and the cost to rent space on cellular towers. However, reducing the size of an antenna array can often result in performance issues.

SUMMARY

The present invention provides systems relating to antennas. Antenna elements are coupled to adjacent other antenna elements by way of a coupler. The coupled antenna elements may be part of the same antenna array. The coupler may take the form of a substrate with conductive traces and the antenna elements may be dipoles or crossed dipole antennas. The coupled antenna elements may have similar polarizations. The coupling between the antenna elements allows for physically smaller reflectors for antenna arrays.

In a first aspect, the present invention provides an antenna system comprising:

a first antenna element;

a second antenna element;

a coupler;

wherein said first antenna element is coupled to said second antenna element by way of said coupler.

In a second aspect, the present invention provides an antenna system comprising:

at least one first dipole antenna element;

at least one second antenna element;

at least one coupler;

wherein said at least one coupler couples said at least one first dipole antenna element with said at least one second antenna element; and said at least one first dipole antenna element is part of an antenna array.

In a third aspect, the present invention provides an antenna system comprising:

at least one first antenna element;

at least one second antenna element;

at least one coupler;

wherein said at least one coupler couples said at least one first antenna element with said at least one second antenna element;

said at least one first dipole antenna element is part of an antenna array; and said coupler couples said at least one first antenna element with said at least one second antenna element using at least one of: capacitive coupling, inductive coupling, direct coupling.

BRIEF DESCRIPTION OF THE DRAWINGS

The present invention will now be described by reference to the following figures, in which identical reference numerals refer to identical elements and in which.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or detail of the following detailed description.

The present invention has a number of embodiments and implementations. Among these embodiments and implementations is an antenna array with coupled antenna elements. By coupling certain antenna elements, the size of the antenna array can be reduced without sacrificing the performance of the antenna array. The coupling between the antenna elements may be by capacitive coupling, inductive coupling, or direct coupling. The present invention relates to coupling between antenna elements such that at least part of a signal is transferred from one antenna element to another. This can be done through the output (by coupling the individual antenna elements) or even at the input to the antenna elements (coupling the input ports so that at least part of a signal sent to one port is also sent to another input port).

Figure 1:
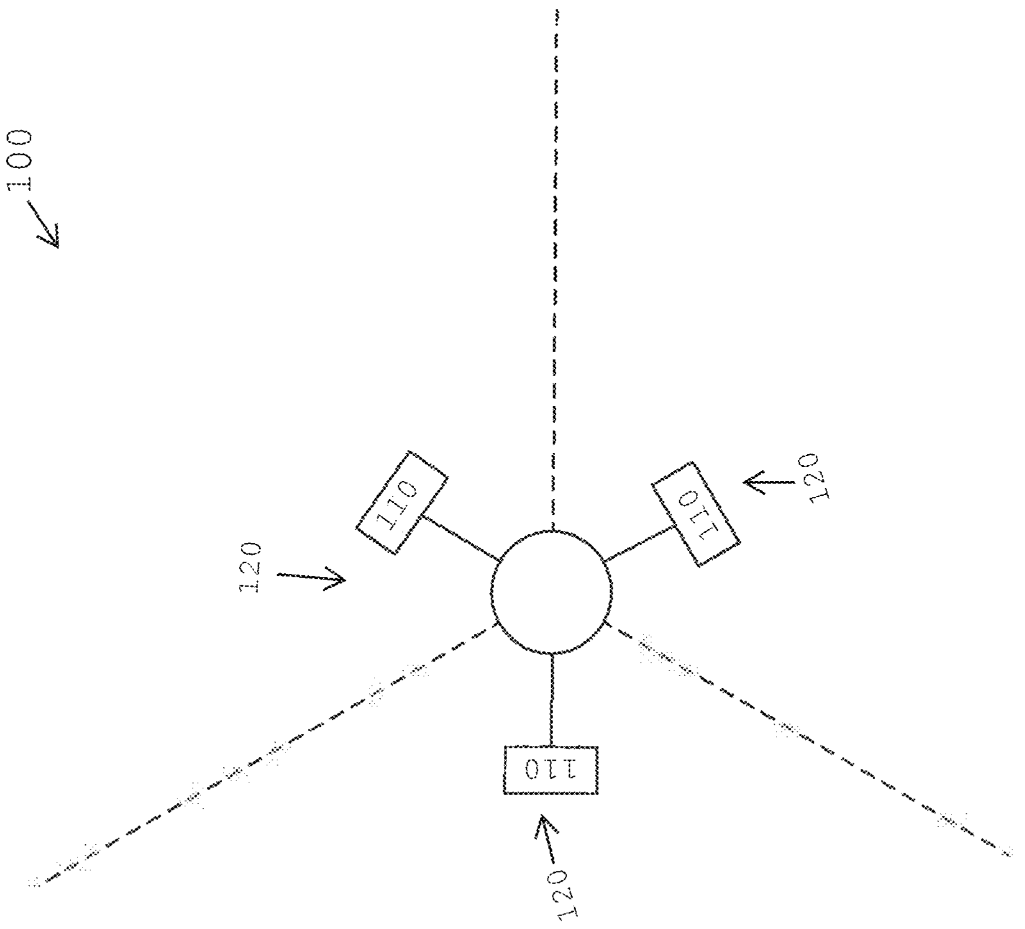
FIG. 1 is a schematic illustration of an antenna system with multiple antennas.

Referring to FIG. 1, presented is a block diagram of an antenna system 100, in accordance with one embodiment of the present invention. The antenna system 100 includes three antenna arrays 110. The three hundred sixty-degree coverage area shown is divided into three sectors covering the sweep of a one hundred twenty-degree angle and each antenna array 110 may be configured to cover one of the three sectors 120 illustrated. In other words, each antenna array 110 is directional and configured to cover a specific geography or area. Preferably, each antenna array 110 has minimal overlapping coverage with the other antenna arrays. In one embodiment, for example, each antenna array 110 may have an average beamwidth of around sixty-five degrees across a frequency band. The antenna system 100 may be, for example, a cellular phone tower. However, while the description below discusses a number of aspects specific to cellular phone antennas, the antenna system 100, and specifically the antenna arrays 110 discussed in further detail below, may be used in any application. Furthermore, any number of antenna arrays 110 (i.e., one or more) may be used in an antenna system 100.

Recently, the Federal Communication Commission in the United States has added bandwidth to a cellular band, expanding the band from 698-896 megahertz (MHz) to 617-896 MHz. In order to cover this expanded range, traditional antenna arrays would have to expand in size as there is an inverse relationship between frequency covered and the size of the antenna elements. In particular, a reflector of a traditional antenna array would have to widen to account for the expanded bandwidth.

Figure 2:
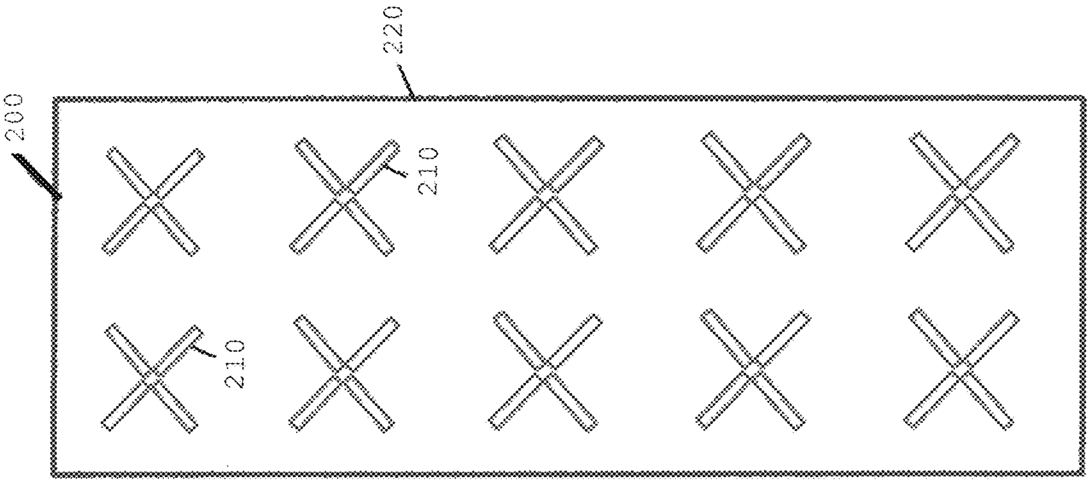
FIG. 2 is a diagram of a four port antenna array.

Referring to FIG. 2, illustrated is a four-port antenna array 200. The antenna array 200 includes two columns of dual polarized dipole antennas 210. The dual polarized dipole antennas 210 are mounted on a reflector 220. When the dual polarized dipole antennas 210 are sized to cover 617-896 MHz, the reflector 220 requires a width of around 1.4λ, where λ is a wavelength of the lowest frequency in the frequency band, to properly function. As the frequency band of the antenna array 200 starts at a lower frequency than in the previous FCC dictated frequency band, the reflector 220 is necessarily wider than antenna arrays covering the older frequency band. One disadvantage of the wider reflector 220 is increased wind load which can cause stress or even damage to the antenna array 200 in high winds. Furthermore, an antenna array 200 in this configuration has a beamwidth of around eighty degrees (equivalent to coverage of a one hundred-sixty-degree area) due to mutual coupling between antenna elements in adjacent columns. The wider beamwidth has multiple disadvantages. Firstly, having a wider beamwidth necessarily results in less gain as the power is spread over a greater area. Secondly, the beamwidth of multiple antenna arrays (e.g., the configuration illustrated in FIG. 1) would result in larger overlapping coverage areas between the arrays. Having larger overlapping coverage areas results in both interference between the antenna arrays 200, degrading the performance of both arrays, and issues with handoffs between arrays as a device may continuously jump from utilizing one array to another when in the overlapping coverage area.

Figure 3:
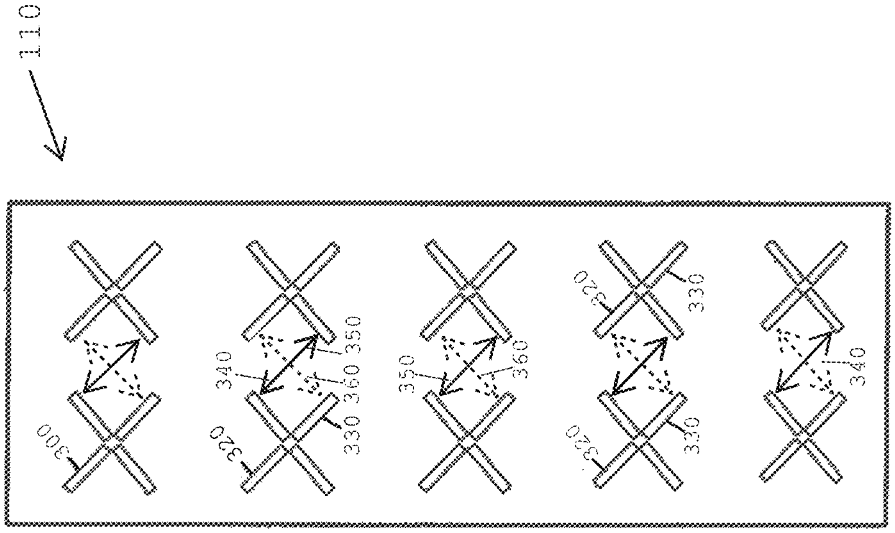
FIG. 3 is a schematic diagram of one aspect of the present invention using the four port antenna array in FIG. 2.

Referring to FIG. 3, illustrated is an antenna array 110 in accordance with an embodiment of the present invention. The antenna array 110 is a four-port antenna array having two columns of dual polarized dipole antenna elements 300 mounted on a reflector 310. Each dual polarized dipole antenna elements 300 includes a first dipole 320 having a first polarization and a second dipole 330 having a second polarization. In the embodiment illustrated in FIG. 3, the dual polarized dipole antenna elements 300 have a +/−forty-five-degree polarization. However, in other embodiments, the dual polarized dipole antenna elements 300 may have zero/ninety-degree polarization. For clarity, each antenna element 300 is an antenna.

The antenna array 110 further includes a coupler 340 between adjacent dual polarized dipole antennas 300. In other words, the coupler 340 is arranged between the columns of antenna elements and couples adjacent antenna elements 300 to one another. In one implementation, the coupler 340 includes a conductive element 350 which capacitively couples a dipole arranged in a first polarization in a first column column to a dipole arranged in the same polarization in the second column. As well, the coupler 340 also includes a conductive element 360 which capacitively couples a dipole arranged in a second polarization in the first column to a dipole arranged in the same polarization in the second column. The coupler 340, via the capacitive connection, injects a small part of the radio frequency signal from the antenna element in one column to the antenna element in the other column. By utilizing the couplers 340 to inject the signal, the mutual coupling between adjacent dual polarized dipole antenna elements 300 is compensated for. Accordingly, an antenna array 110 utilizing the coupler 340 can achieve a beamwidth of around sixty-five degrees. Furthermore, the width of the reflector 310 can be reduced to around 1.1λ, significantly reducing the width of the antenna array 110 (using the capacitive coupling between antenna elements) relative to the antenna array 200 (without the capacitive coupling between antenna elements). A reduced reflector width has numerous advantages. Firstly, as discussed above, a reduced reflector width reduces the wind load on the antenna array. Furthermore, a reduced reflector width can reduce rental costs for renting space on a cellular tower or the like.

Figure 4:
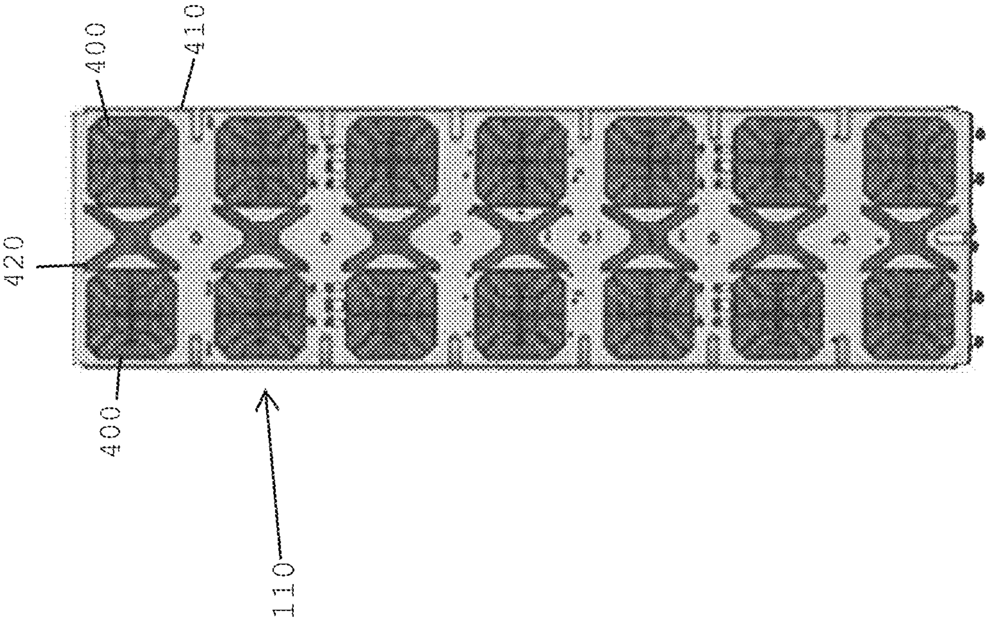
FIG. 4 illustrates a two-by-seven antenna array of another implementation of another aspect of the present invention.

Referring to FIG. 4, illustrated is another antenna array 110, in accordance with an embodiment. The antenna array 110 illustrated in FIG. 4 includes a two-by-seven array of antenna elements 400 arranged on a reflector 410. In this embodiment, the antenna elements are dual-polarized dipole antennas formed on printed circuit boards (PCBs). However, the antenna elements 400 may be any type of dipole antenna manufactured using any known technique. The antenna array 110 further includes seven couplers 420 arranged in-between adjacent antenna elements 400. As can be seen, each coupler 420 capacitively couples an antenna element in one column to another antenna element in the other column.

It should be clear that even though FIG. 4 shows that each antenna element 400 is coupled to an adjacent antenna element 400 by way of coupler 420, not every antenna element in an array needs to be coupled. Thus, of the seven antenna elements in a first column in FIG. 4, a proper subset may be coupled to antenna elements in the second column (i.e., not all antenna elements are coupled). Of the seven antenna elements, maybe only three are coupled to other antenna elements. In addition, for antenna arrays that use polarized antenna elements, a polarized antenna element may be coupled to a non-polarized antenna element or the polarized antenna element may be coupled to another antenna element with a different polarization. Or, as in FIG. 3, a polarized antenna element may be coupled to another antenna element with the same polarization.

Figure 5:
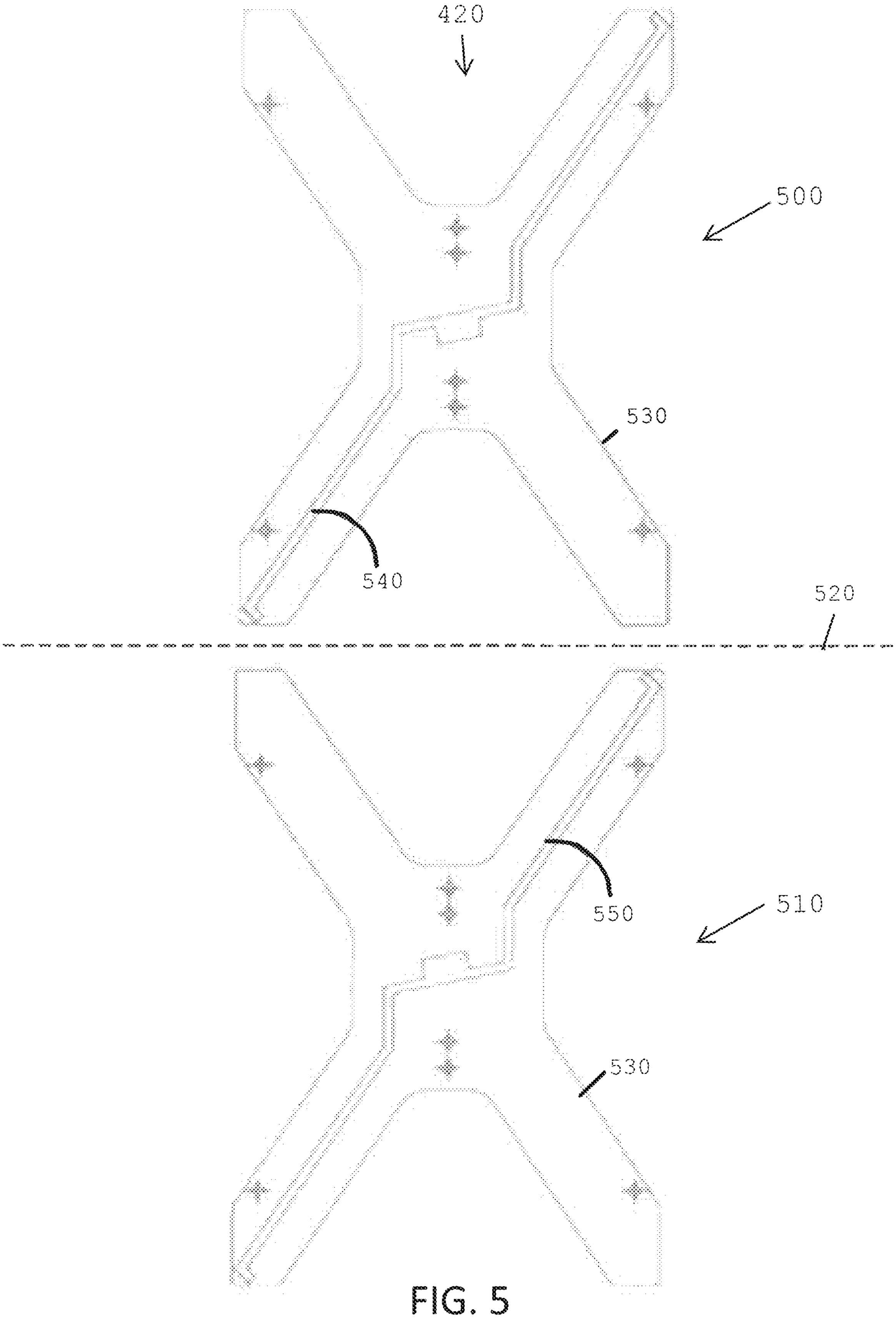
FIG. 5 shows two views of a coupler as used in the antenna array shown in FIG. 4.

Referring to FIG. 5, illustrated is a closer view of one embodiment of the coupler 420 shown in FIG. 4. FIG. 5 illustrates both sides of the coupler 420. The upper portion illustrates a first side 500 and the lower portion of FIG. 5 illustrates a second side 510, rotated one-hundred eighty degrees around an axis 520 relative to the first side. As can be seen from the figure, the coupler 420 includes substrate 530 and conductive traces 540 and 550. In the embodiment illustrated in FIG. 5, the substrate 530 is a printed circuit board. However, the substrate 530 could be any known non-conductive surface. Furthermore, in other embodiments, a substrate 530 may not be present—the substrate 530 is merely a vehicle to provide structure for the conductive traces 540 and 550. The conductive trace 540 capacitively couples a dipole of the antenna elements 400 having a first polarization from one column to the dipole having the same polarization from the other column. Likewise, the conductive trace 550 capacitively couples a dipole of the antenna elements 400 having a second polarization from one column to the dipole having the same polarization from the other column.

Figure 6:
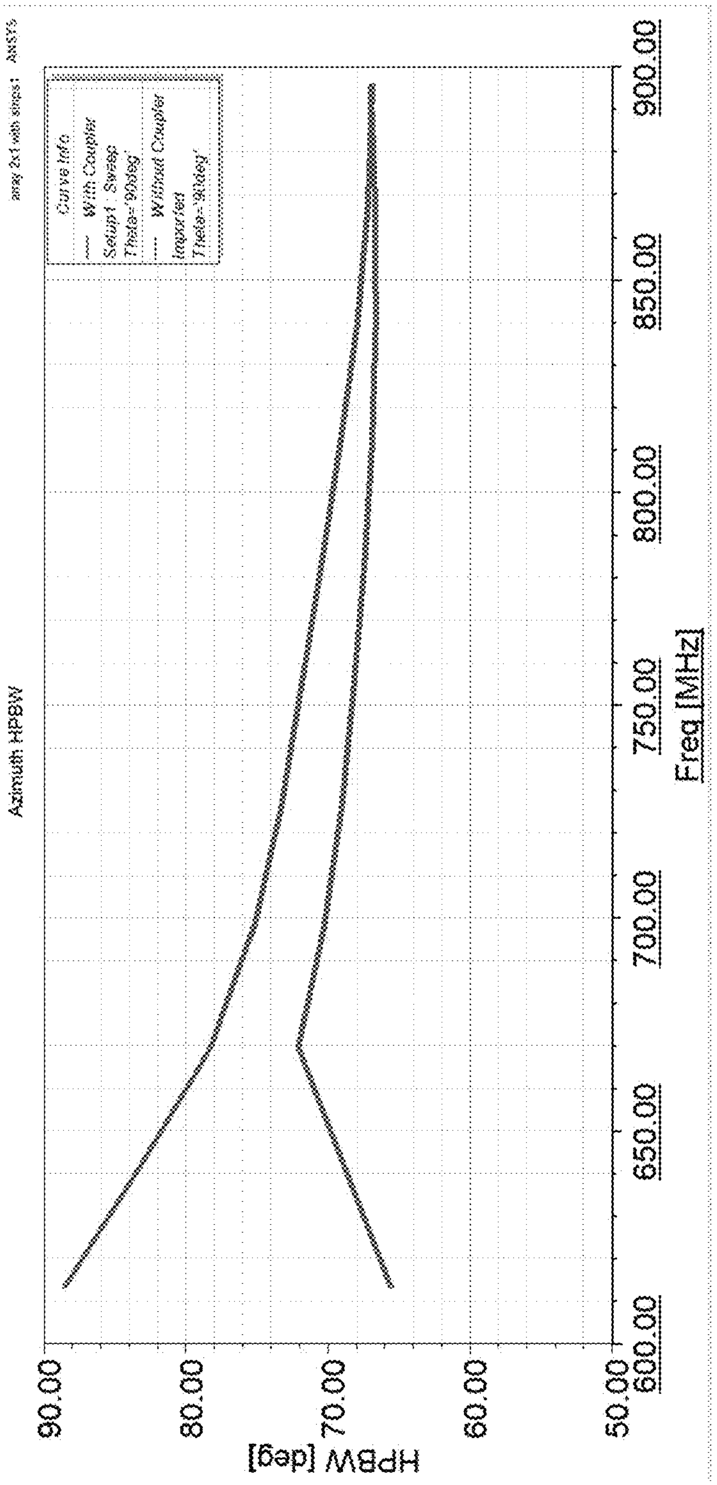
FIG. 6 is a plot of the beamwidths for the antenna array in FIG. 4 with the couplers in use and with the couplers not being in use.

Referring to FIG. 6, illustrated is a plot of the beamwidth of the antenna array 110 illustrated in FIG. 4 both with and without the use of the coupler 420. As seen in FIG. 6, the antenna array 400 without the coupler 420 has a beamwidth which approaches ninety degrees at the lower end of the frequency band. However, as can be seen in FIG. 6, the beamwidth of the antenna array 400 with the coupler 420 is significantly reduced across the entire frequency band, with the beamwidth approaching the desired beamwidth of sixty-five degrees.

Figure 7:
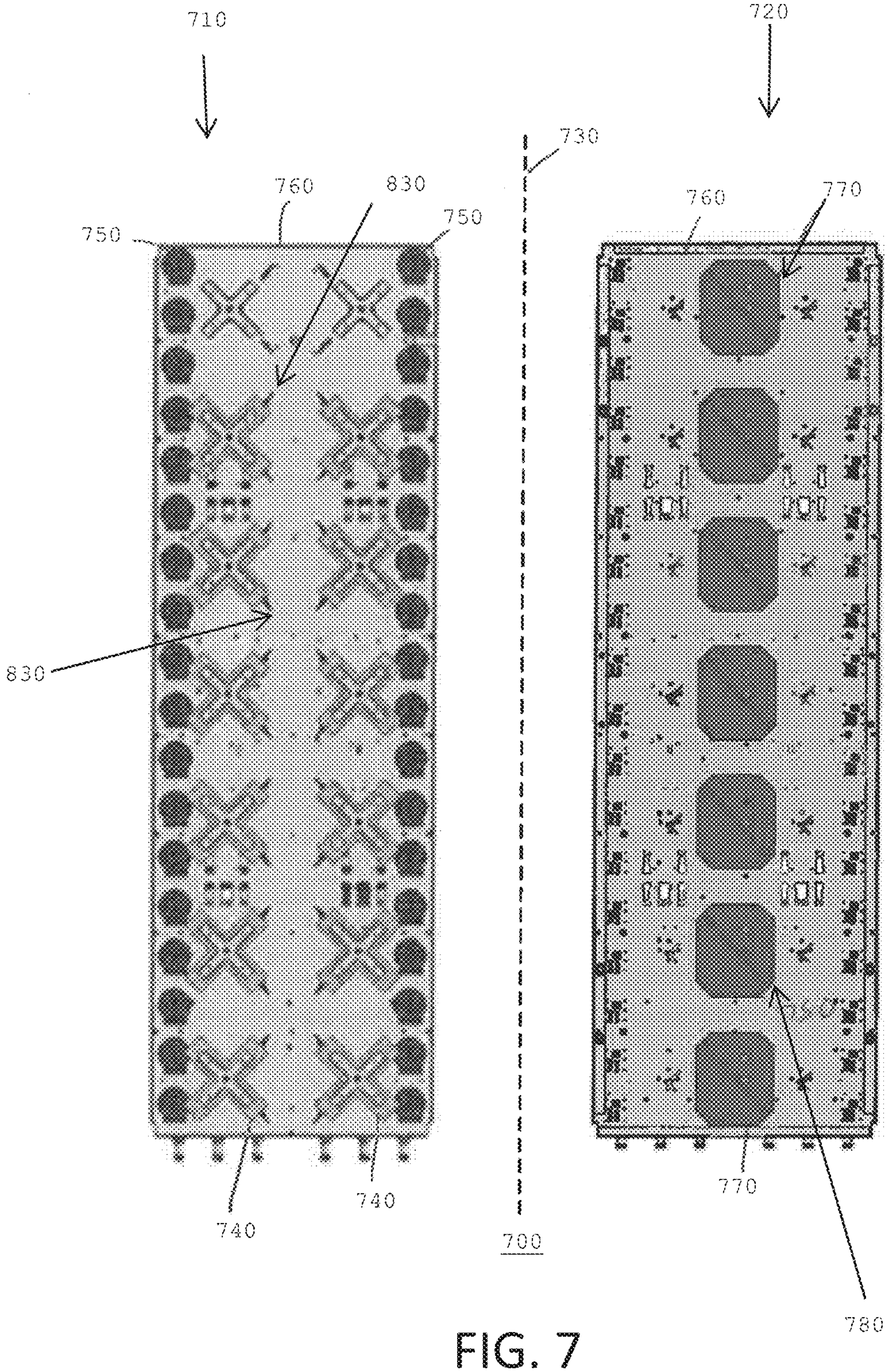
FIG. 7 is a diagram of another implementation of the present invention on a dual band array.

Referring to FIG. 7, illustrated is a dual-band antenna array 700, in accordance with another embodiment of the present invention. FIG. 7 illustrates a first side 710 of the antenna array 700 and a second side 720 of the antenna array 700 rotated one hundred-eighty degrees around the axis 730. The antenna array 700 includes two columns of antenna elements 740 operating in a 617-896 MHz band and two columns of antenna elements 750 covering a 1695-2690 MHz band arranged on a reflector 760. The antenna elements 750 are sufficiently far enough apart such that there is little to no mutual coupling between the elements. However, the antenna elements 740 would be subject to mutual coupling due to their close proximity to one another. Accordingly, the dual band antenna array 700 further includes a number of couplers 770 arranged on both sides 710 and 720 of the antenna array 700, as discussed in further detail below.

The antenna elements 740 illustrated in FIG. 7 are dual-polarized dipole elements which extend a distance from the reflector 760. In one embodiment, for example, the antenna elements 740 may extend ¼λ from the reflector 760, however other distances are possible. In order to effectively inject a signal between antenna elements 740 in adjacent columns, the coupler 770 preferably includes conductive traces which include a portion which also extends ¼λ from the reflector 760. In order to achieve this distance, the couplers 770 illustrated in FIG. 7 each includes a substrate 780 on the second side 720 of the antenna array. However, there are other ways to keep ¼λ length and to have the coupler PCB on top of the reflector by using a meander line for the vertical section. Each coupler 770 may be a metal sheet that is shaped to a proper shape (e.g. an octagonal shape).

Figure 8:
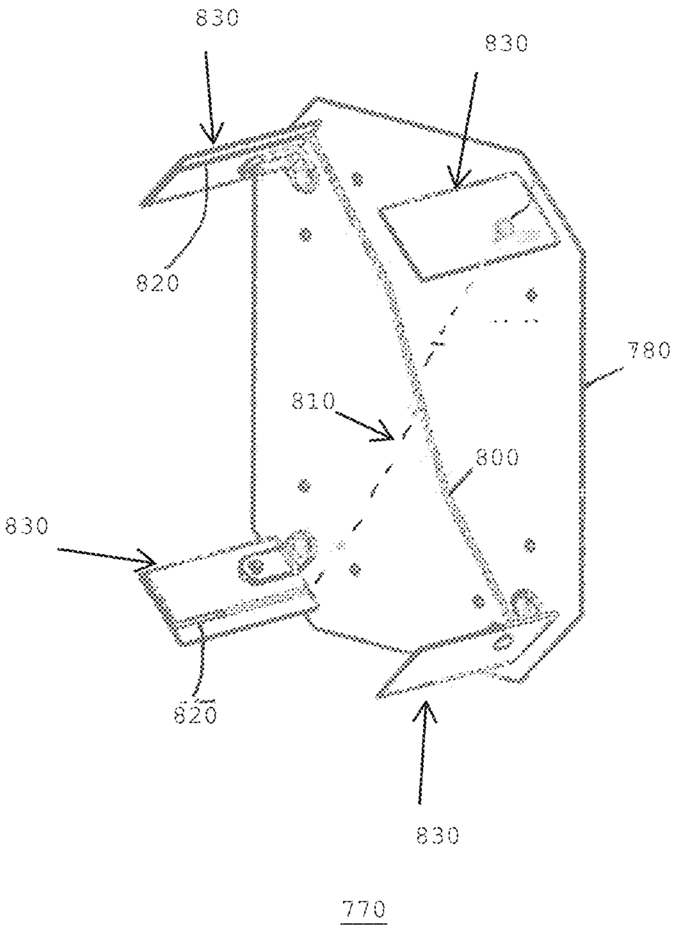
FIG. 8 illustrates a coupler as used in the dual band array shown in FIG. 7.

Referring to FIG. 8, illustrated is a perspective view of the coupler 770 shown in FIG. 7, in accordance with one embodiment of the present invention. As seen in FIG. 8, the coupler 770 includes a substrate 780 and a conductive trace 800 on one side of substrate 780. A similar conductive trace 810 is formed on the other side of the substrate 780, similar to the conductive traces 540 and 550 illustrated in FIG. 5. Each conductive trace 800 and 810 is coupled to a conductive trace 820 formed perpendicular to the conductive traces 800 and 810. The conductive traces 820 extend through the reflector 760 illustrated in FIG. 7 to approach and capacitively couple the antenna elements 750. For clarity, the coupler 770 includes structures 830 that extend vertically relative to the horizontal substrate 780 (i.e. the structures 830 are at substantially 90 degrees to the substrate 780). Each of the structures 830 has a conductive trace 820 that continues from either a conductive trace 800 on one side of the substrate 780 or a conductive trace 810 on another side of the substrate 780 to one side of the structure 830. As can be seen, conductive trace 800 is on one side of substrate 780 while conductive trace 810 is on the other side of substrate 780. When coupler 770 is used as in FIG. 7, the structures 830 protrude from substrate 760 such that the structures 830 are adjacent to the antenna elements 740. In FIG. 7, the protruding structures 830 are seen as being adjacent to the edges of the arms of the antenna elements 740.

Figure 9:
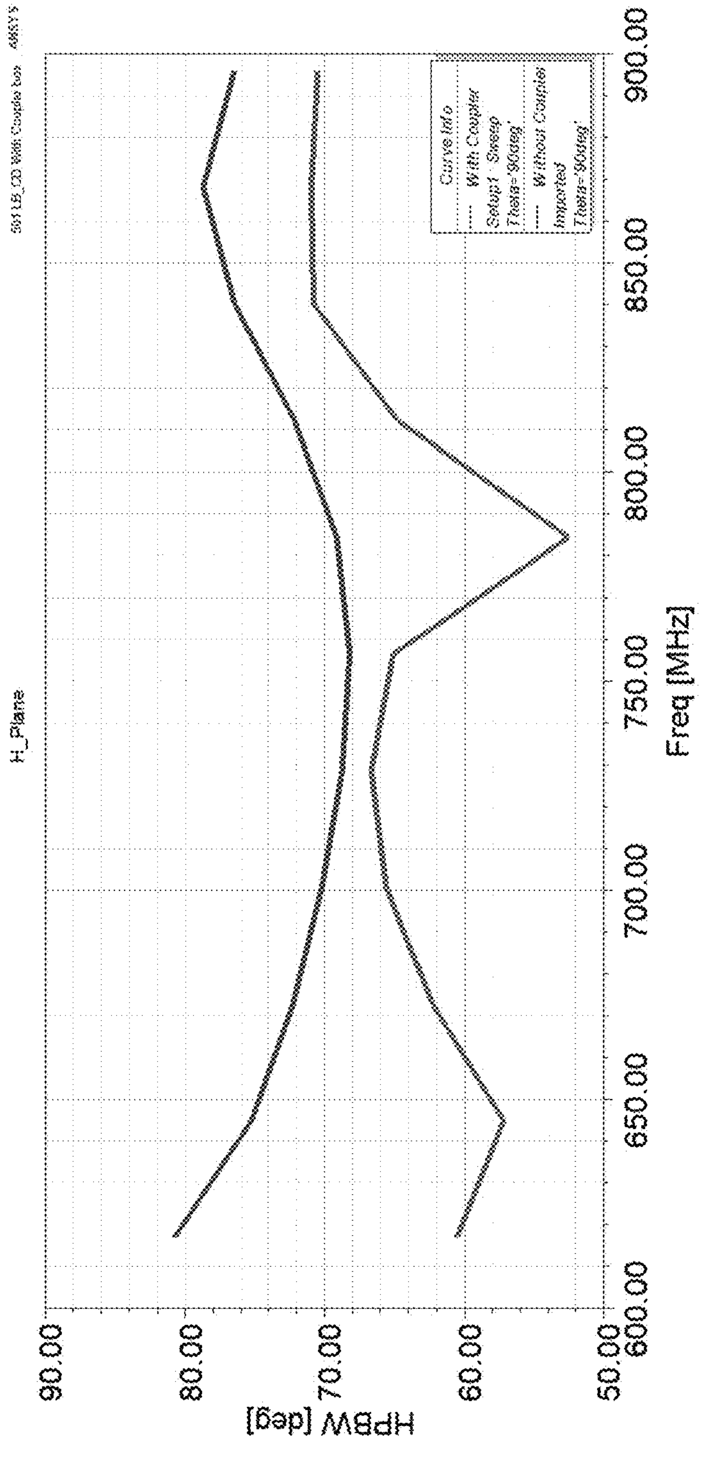
FIG. 9 is a plot of the beamwidths for the antenna array in FIG. 7 with the couplers in use and with the couplers not being in use.

Referring to FIG. 9, illustrated is a plot of the beamwidth of the antenna array 700 illustrated in FIG. 7 with and without the coupler 770 in use. As can be seen in FIG. 9, the antenna array 700 without the coupler 770 has a beamwidth which approaching eighty degrees. In contrast, the antenna array 700 with the coupler 770 in use has a reduced beamwidth across the entire frequency band with an average beamwidth of around sixty-five degrees.

Figure 10:
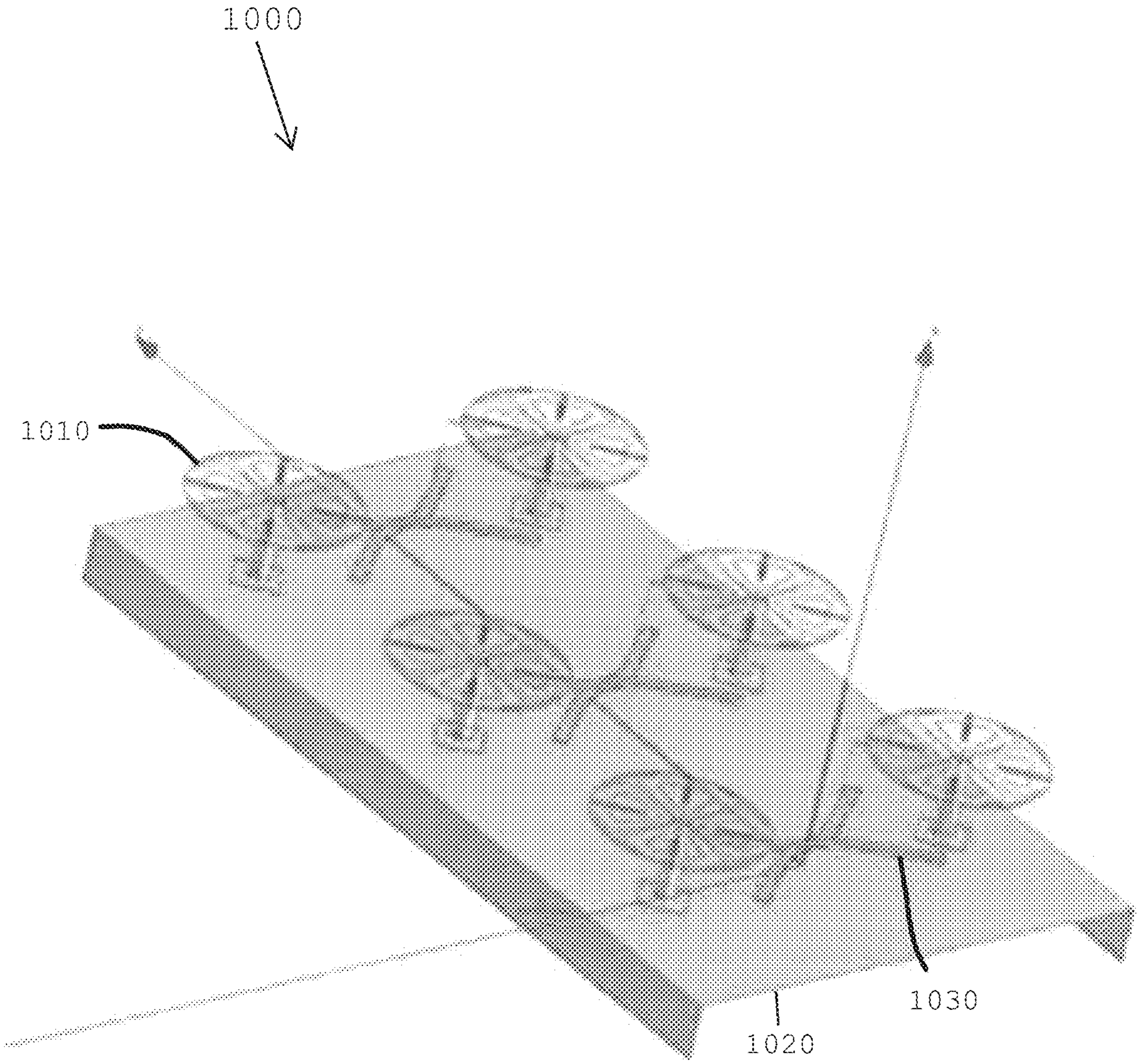
FIG. 10 is yet another illustration of another implementation of the present invention in a three-by-two antenna array.

Referring to FIG. 10, illustrated is a perspective view of another antenna array 1000, in accordance with another embodiment of the present invention. The antenna array 1000 includes antenna elements 1010 in a three-by-two configuration mounted on a reflector 1020. The antenna array 1000 further includes a coupler 1030 which capacitively couples antenna elements 1010 from one column to antenna elements 1010 in the other column.

Figure 11:
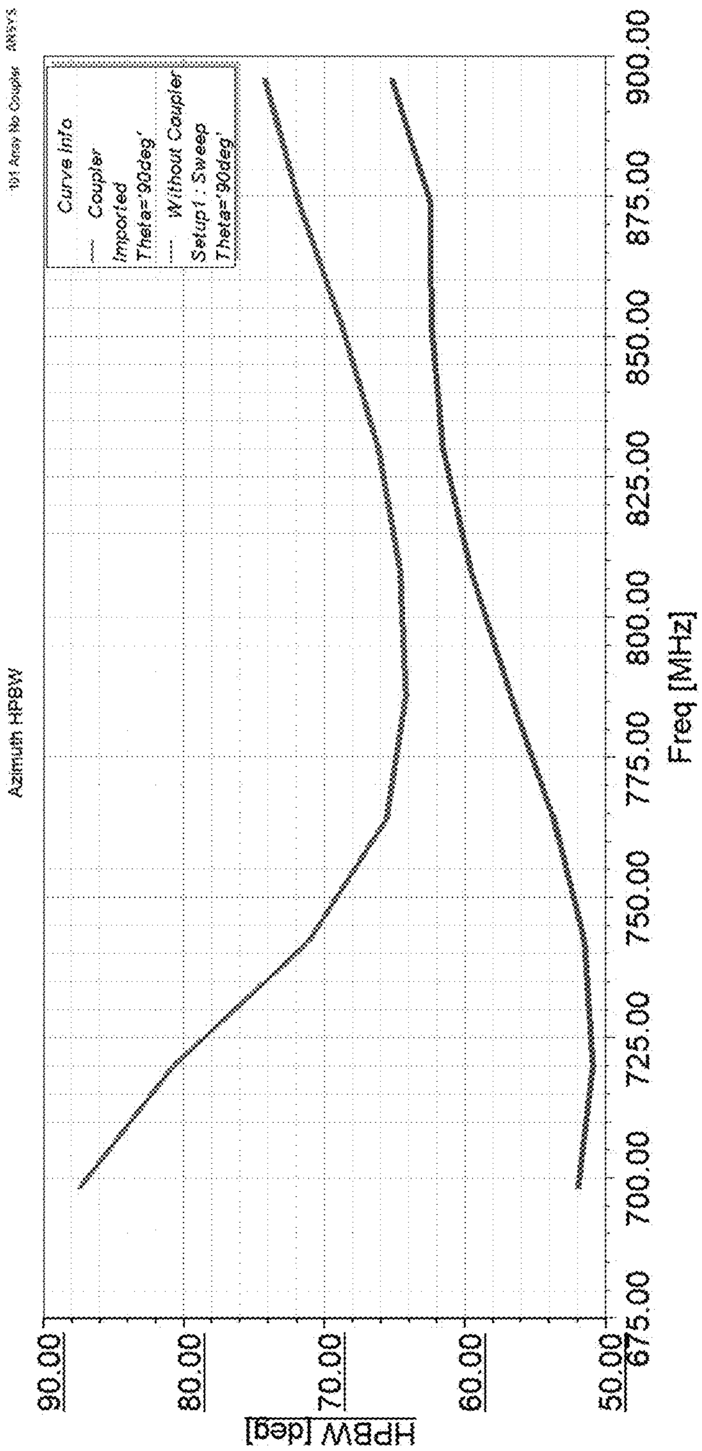
FIG. 11 is a plot of the beamwidths for the antenna array in FIG. 10 with the couplers in use and with the couplers not being in use.

Referring to FIG. 11, illustrated is a plot of the the beamwidth of the antenna array 1010 illustrated in FIG. 10 both with and without the coupler 1030 in use. As can be seen in FIG. 11, the antenna array 1000 without the coupler 1030 in use has a beamwidth that approaches eighty-seven degrees at certain areas of the frequency band. In contrast, the antenna array 1000 with the coupler 1030 in use has a reduced beamwidth across the entire frequency band with an average beamwidth of around fifty-three degrees.

It should be clear that, while the above examples use couplers between antenna elements operating in or around the 617-896 or 698-896 MHz frequency bands, the couplers may be used between any antenna elements in any frequency band arranged close enough to cause mutual coupling. Furthermore, while the figures presented antenna elements generally as linear dipoles or folded dipoles, the concepts discussed herein could be applied to any other antenna element type.

It should further be clear that, while the above examples discuss capacitive coupling between antenna elements, other types and forms of coupling may be used to couple antenna elements to one another. Thus, direct coupling, inductive coupling, and capacitive coupling may be used in any of the embodiments illustrated and explained above. Thus, it should be clear that any form of coupling using couplers may be used between any two antenna elements regardless of whether these two antenna elements are part of a larger antenna array or not. Similarly, capacitive and other forms of coupling between antenna elements may be used between any two antenna elements regardless of whether these antenna elements are of the same type or not. As such, coupling may be used between, for example, a dipole antenna element and a patch antenna element. Similarly, capacitive, inductive, and even direct coupling may be used between two stand alone patch antenna elements or two patch antenna elements that are both part of the same antenna array. As well, capacitive and/or other forms of coupling using suitable couplers may be used between two antenna elements, each of which is part of a different antenna array.

Figure 12:
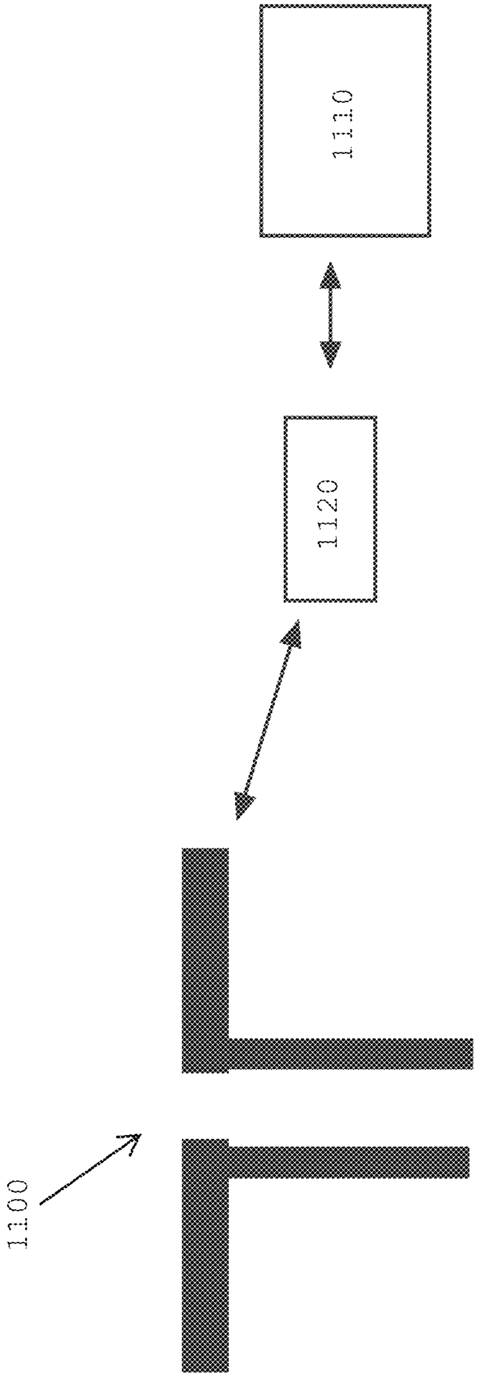
FIG. 12 is a schematic diagram of one aspect of the present invention.

Referring to FIG. 12, a schematic diagram of an embodiment of the present invention in accordance with the above description is illustrated. As can be seen, a dipole antenna element 1100 is coupled with an antenna element 1110 by way of a coupler 1120. The dipole antenna element 1100 may be part of a larger antenna array or it may be a standalone antenna. Similarly, the antenna element 1110 may be another dipole antenna element or it may be of a different type of antenna element (e.g., a patch antenna, a monopole antenna, or some form of aperture antenna). The antenna element 1110 may be part of the same array as the antenna element 1100 or the antenna element 1110 may be part of a different array. As well, the antenna element 1110 may be a standalone antenna.

It should also be clear that the coupling between antenna elements may be used for ends other than reducing the size of a reflector common to the two antenna elements being coupled. As should be clear to a person skilled in the art, capacitive and inductive coupling both involve a coupler that has no direct physical contact between the coupler and the antenna elements being coupled. Any physical structure that allows capacitive or inductive coupling to occur between two antenna elements may be considered as a coupler. Of course, direct coupling between antenna elements may also be used. For such direct coupling, a direct physical link through which a signal may travel may be used between the two antenna elements being coupled. It should also be clear that, while the antenna elements being coupled in the examples provided above include antenna elements that have the same polarization, this is not a necessity as antenna elements with dissimilar polarizations may be coupled to each other.

As noted above, the coupling between the antenna elements operates to reduce the reflector required as well as increasing the gain and/or adjusting the resulting beamwidth. Similar effects may be produced by injecting a signal from one antenna element into another antenna element as explained above. While this injection is accomplished above using coupling between the antenna elements, the same may be achieved by signal injection through the output ports. For this configuration, a signal being sent to one antenna array or antenna elements may be injected to another antenna array or to other antenna elements by coupling the input ports of the two antenna arrays/antenna elements together. Thus, an input port for antenna array A may be coupled to the input port for antenna array B to thereby inject at least a part of the signal being sent to antenna array A to antenna array B. The coupling between the input ports may be capacitive, inductive, or direct.

A person understanding this invention may now conceive of alternative structures and embodiments or variations of the above all of which are intended to fall within the scope of the invention as defined in the claims that follow.

We claim:

1. An antenna system comprising:
a first antenna element;
a second antenna element; and
a coupler;
wherein
said first antenna element is coupled to said second antenna element by way of said coupler,
both of said first antenna element and said second antenna element are part of a multi-column antenna array,
at least one of said first antenna element or said second antenna element is a dipole antenna element,
said coupler couples said first antenna element with said second antenna element using at least one of: capacitive coupling, inductive coupling, or direct coupling,
said first antenna element is in a first column of said multi-column antenna array and said second antenna element is in a second column of said multi-column antenna array, said first column being adjacent said second column and said first antenna element is adjacent said second antenna element, and
said multi-column antenna array produces a beam with a beamwidth that is narrower than a beam produced by the multi-column antenna array when said coupler is absent.

2. The antenna system according to claim 1, wherein said second antenna element is said dipole antenna element.

3. The antenna system according to claim 1, wherein said coupler comprises at least one conductive trace deposited on a non-conductive substrate.

4. The antenna system according to claim 1, wherein one of said first antenna element and said second antenna element is of a type other than a dipole antenna element.

5. The antenna system according to claim 1, wherein both said first antenna element and said second antenna elements are dipole antenna elements and wherein an arm of said first antenna element is capacitively coupled to an arm of said second antenna element by way of said coupler.

6. The antenna system according to claim 1, wherein said first antenna element is a first dipole of a first crossed dipole antenna element and said second antenna element is a first dipole of a second crossed dipole antenna element.

7. The antenna system according to claim 6, wherein a second dipole of said first crossed dipole antenna element is capacitively coupled to a second dipole of said second crossed dipole antenna element.

8. The antenna system according to claim 1, wherein only a subset of antenna elements of said multi-column antenna array are coupled to other antenna elements of said multi-column antenna array.

9. The antenna system according to claim 1, wherein at least one antenna element of said multi-column antenna array is uncoupled from all other antenna elements of said multi-column antenna array.

10. An antenna system comprising:
at least one first dipole antenna element;
at least one second antenna element; and
at least one coupler;
wherein
said at least one coupler couples said at least one first dipole antenna element with said at least one second antenna element,
both said at least one first dipole antenna element and said at least one second antenna element are part of a multi-column antenna array,
said at least one first dipole antenna element is in a first column of said multi-column antenna array and said at least one second antenna element is in a second column of said multi-column antenna array, said first column being adjacent said second column and said at least one first dipole antenna element is adjacent said at least one second antenna element, and said multi-column antenna array produces a beam with a beamwidth that is narrower than a beam produced by the multi-column antenna array when said at least one coupler is absent.

11. The antenna system according to claim 10, wherein said at least one second antenna element is also a dipole antenna element.

12. The antenna system according to claim 10, wherein said at least one first dipole antenna element is part of a crossed dipole antenna element.

13. The antenna system according to claim 11, wherein said at least one second dipole antenna element is part of a crossed dipole antenna element.

14. The antenna system according to claim 10, wherein said at least one coupler comprises at least one conductive trace deposited on a non-conductive substrate.

15. The antenna element according to claim 10, wherein said at least one coupler couples said at least one first dipole antenna element with said at least one second antenna element using capacitive coupling.

16. The antenna element according to claim 10, wherein said at least one coupler couples said at least one first dipole antenna element with said at least one second antenna element using inductive coupling.

17. The antenna element according to claim 10, wherein said at least one coupler couples said at least one first dipole antenna element with said at least one second antenna element using direct coupling.

18. An antenna system comprising:

at least one first antenna element;

at least one second antenna element; and at least one coupler;

wherein said at least one coupler couples said at least one first antenna element with said at least one second antenna element, both said at least one first antenna element and said at least one second antenna element are part of a multi-column antenna array, said coupler couples said at least one first antenna element with said at least one second antenna element using at least one of: capacitive coupling, inductive coupling, and direct coupling, said at least one first antenna element is in a first column of said multi-column antenna array and said at least one second antenna element is in a second column of said multi-column antenna array, said first column being adjacent said second column and said at least one first antenna element is adjacent said at least one second antenna element, and said multi-column antenna array produces a beam with a beamwidth that is narrower than a beam produced by the multi-column antenna array when said at least one coupler is absent.

* * * * *